United States Patent
Xu et al.

(10) Patent No.: US 12,045,159 B2
(45) Date of Patent: Jul. 23, 2024

(54) AUTOMATION TEST ACCELERATOR

(71) Applicant: Dell Products L.P., Round Rock, TX (US)

(72) Inventors: Celine Ling Xu, Shanghai (CN); Xiaowei Shen, Shanghai (CN); Jinghui Zhang, Shanghai (CN); Xiaoxuan Dong, Shanghai (CN); Wencheng Lu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 71 days.

(21) Appl. No.: 17/878,294

(22) Filed: Aug. 1, 2022

(65) Prior Publication Data

US 2024/0012743 A1 Jan. 11, 2024

(30) Foreign Application Priority Data

Jul. 11, 2022 (CN) .......................... 202210811714.5

(51) Int. Cl.
*G06F 9/44* (2018.01)
*G06F 11/36* (2006.01)

(52) U.S. Cl.
CPC ...... *G06F 11/3684* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 11,086,765 | B2 * | 8/2021 | Mukherjee | G06F 11/3692 |
| 2005/0125188 | A1 * | 6/2005 | Eden | G06F 11/3688 |
| | | | | 714/E11.207 |
| 2017/0371773 | A1 * | 12/2017 | Gentile | G06F 11/3688 |
| 2019/0340113 | A1 * | 11/2019 | Earanti | G06F 11/3688 |
| 2020/0379887 | A1 * | 12/2020 | Nochilur | G06F 11/3684 |
| 2021/0191843 | A1 * | 6/2021 | Stocker | G06F 11/3684 |

* cited by examiner

*Primary Examiner* — Qamrun Nahar
(74) *Attorney, Agent, or Firm* — Larson Newman, LLP (57) ABSTRACT

An information handling system includes a memory and a processor. The memory stores an automation test set for the information handling system, and the automation test set includes multiple test cases. The processor determines that each test case of a subset of the test cases includes a same common and time-intensive test step (CTITS). The processor creates a CTITS module based on the same CTITS in the subset test cases. The processor also creates multiple normal test cases based on the test cases of the automation test set. The processor creates a virtual test case to implement the CTITS, executes first test step code within a first normal test case, and executes second test step code within a second normal test case. In response to execution of both the first and second test step code being completed, the processor executes the CTITS via the CTITS module.

20 Claims, 4 Drawing Sheets

AUTOMATION TEST ACCELERATOR

FIELD OF THE DISCLOSURE

The present disclosure generally relates to information handling systems, and more particularly relates to an automation test accelerator.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory that stores an automation test set for the information handling system, and the automation test set includes multiple test cases. A processor may determine that each test case of a subset of the test cases includes a same common and time-intensive test step (CTITS). The processor may create a CTITS module based on the same CTITS in the subset test cases. The processor also may create multiple normal test cases based on the test cases of the automation test set. An identification for the CTITS is inserted within each of the normal test cases, and the normal test cases include first and second normal test cases. The processor may create a virtual test case to implement the CTITS, execute first test step code within the first normal test case, and execute second test step code within the second normal test case. In response to execution of both the first and second test step code being completed, the processor may execute the CTITS via the CTITS module.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
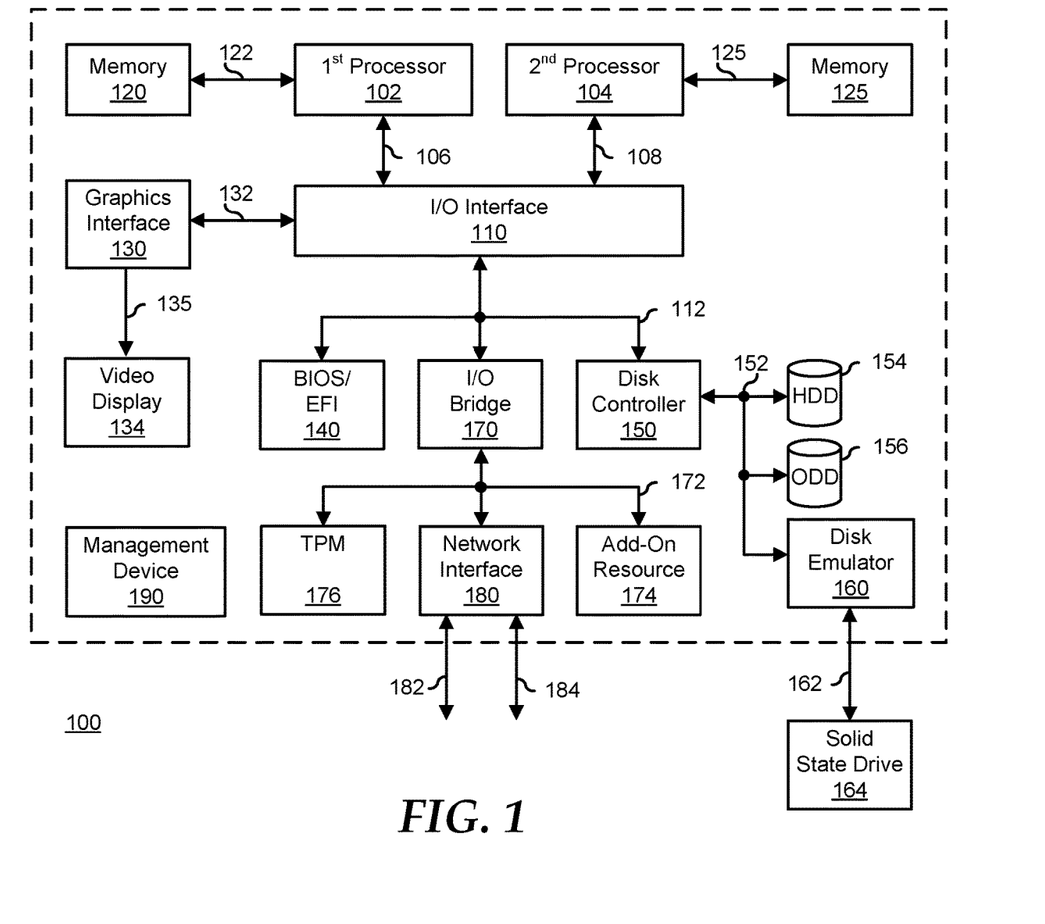
FIG. 1 is a block diagram of a general information handling system according to an embodiment of the present disclosure.

FIG. 1 illustrates a generalized embodiment of an information handling system 100 according to an embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below and operates to perform one or more of the methods described below. Information handling system 100 includes a processors 102 and 104, an input/output (I/O) interface 110, memories 120 and 125, a graphics interface 130, a basic input and output system/universal extensible firmware interface (BIOS/UEFI) module 140, a disk controller 150, a hard disk drive (HDD) 154, an optical disk drive (ODD) 156, a disk emulator 160 connected to an external solid state drive (SSD) 162, an I/O bridge 170, one or more add-on resources 174, a trusted platform module (TPM) 176, a network interface 180, a management device 190, and a power supply 195. Processors 102 and 104, I/O interface 110, memory 120, graphics interface 130, BIOS/UEFI module 140, disk controller 150, HDD 154, ODD 156, disk emulator 160, SSD 162, I/O bridge 170, add-on resources 174, TPM 176, and network interface 180 operate together to provide a host environment of information handling system 100 that operates to provide the data processing functionality of the information handling system. The host environment operates to execute machine-executable code, including platform BIOS/UEFI code, device firmware, operating system code, applications, programs, and the like, to perform the data processing tasks associated with information handling system 100.

In the host environment, processor 102 is connected to I/O interface 110 via processor interface 106, and processor 104 is connected to the I/O interface via processor interface 108. Memory 120 is connected to processor 102 via a memory interface 122. Memory 125 is connected to processor 104 via a memory interface 127. Graphics interface 130 is connected to I/O interface 110 via a graphics interface 132 and provides a video display output 135 to a video display 134. In a particular embodiment, information handling system 100 includes separate memories that are dedicated to each of processors 102 and 104 via separate memory interfaces. An example of memories 120 and 125 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 140, disk controller 150, and I/O bridge 170 are connected to I/O interface 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 110 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 140 includes BIOS/UEFI code operable to detect resources within information handling system 100, to provide drivers for the resources, initialize the resources, and access the resources. BIOS/UEFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O bridge 170 includes a peripheral interface 172 that connects the I/O bridge to add-on resource 174, to TPM 176, and to network interface 180. Peripheral interface 172 can be the same type of interface as I/O channel 112 or can be a different type of interface. As such, I/O bridge 170 extends the capacity of I/O channel 112 when peripheral interface 172 and the I/O channel are of the same type, and the I/O bridge translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as I/O interface 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management device 190 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 100. In particular, management device 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management device 190 can include a network connection to an external management system, and the management device can communicate with the management system to report status information for information handling system 100, to receive BIOS/UEFI or system firmware updates, or to perform other task for managing and controlling the operation of information handling system 100.

Management device 190 can operate off of a separate power plane from the components of the host environment so that the management device receives power to manage information handling system 100 when the information handling system is otherwise shut down. An example of management device 190 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 190 may further include associated memory devices, logic devices, security devices, or the like, as needed or desired.

Figure 2:
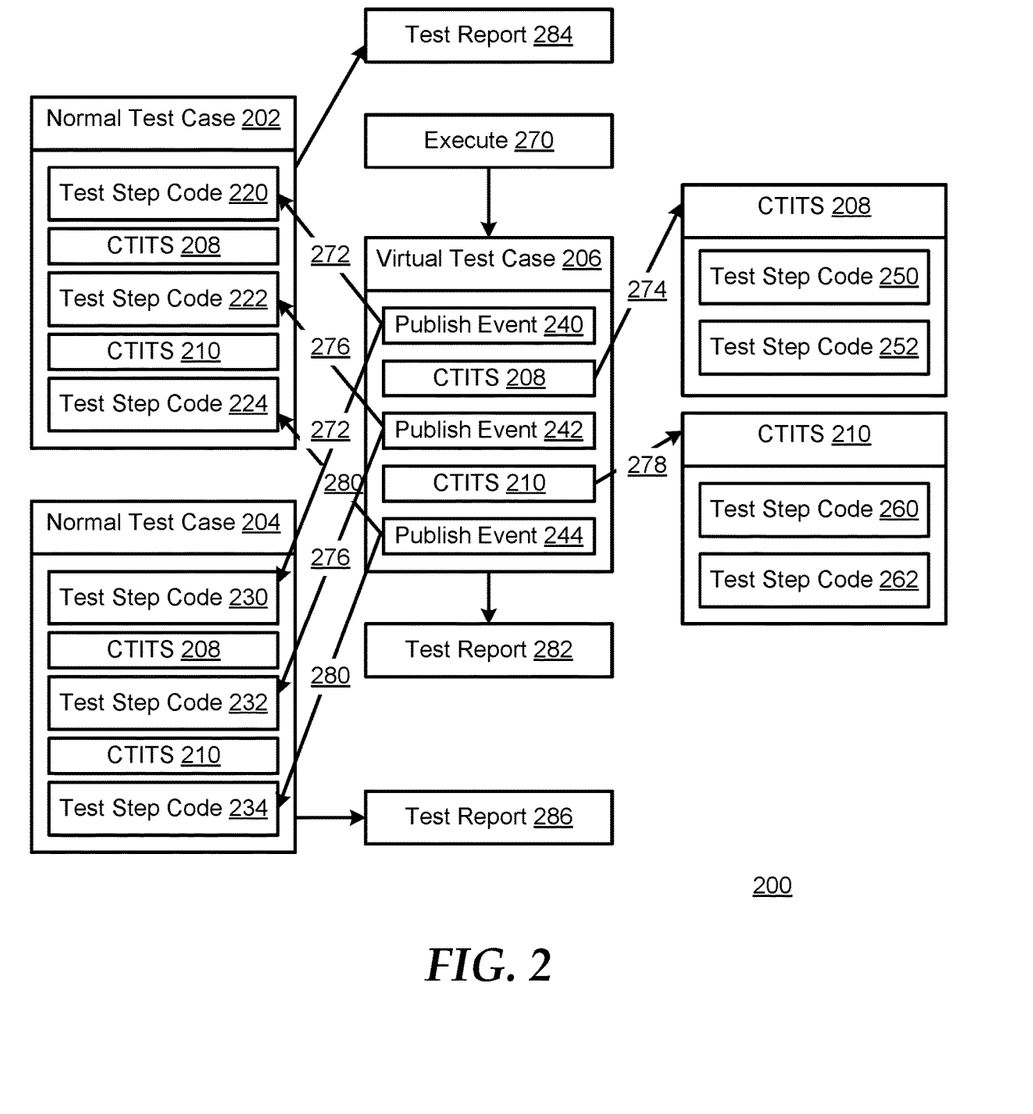
FIG. 2 is a diagram of multiple test cases for an automation set of an information handling system according to at least one embodiment of the present disclosure.

FIG. 2 illustrates multiple test cases 200 for an automation set of an information handling system, such as information handling system 100 of FIG. 1, according to at least one embodiment of the present disclosure. In an example, code within test cases 200 may be performed by any suitable device or circuitry in an information handling system, such as processor 102 or 104 of FIG. 1. In certain examples, the automation set of the information handling system may be any suitable test process, such as a firmware test set, to be implemented by processor 102. Processor 102 may create different test cases and modules to implement automation test set 200 as will be described below. In response to these operations, automation test set 200 includes normal test cases 202 and 204, a virtual test case 206 and common and time intensive test steps (CTITS) modules 208 and 210. Normal test case 202 includes test step code 220, 222, and 224, and identifiers for CTITS modules 208 and 210. Normal test case 204 includes test step code 230, 232, and 234, and identifiers for CTITS modules 208 and 210. Virtual test case 206 includes publish events 240, 242, and 244, and identifiers for CTITS modules 208 and 210. CTITS module 208 includes test step code 250 and 252. CTITS module 210 includes test step code 260 and 262.

In certain examples, most automation tests require a physical hardware testbed for execution, and test cases in a test suite may be executed on a one-by-one basis because the test cases share a single hardware resource. In previous information handling systems, hardware resources may be limited based on a large amount of test cases to be executed. In these previous information handling systems, the limited number of hardware resources may lead to inefficiency of automation tests. In an example, an automation test suite may include multiple CTITS, such as a system reboot. In certain examples, test cases in an automation test suite may be executed in one by one because the test cases share a single hardware resource. In this example, as the number of test cases increase, the CTITS may dominate the test time and will lead to long test durations.

In previous information handling systems, an attempt to handle the large number test cases may be handled by simulation, adding more testbeds, creating a single large test case, or the like. However, these previous information handling system fail to provide efficient and cost effective manner to perform the multiple test cases of an automation test set. Information handling system 100 may be improved by processor 102 maintaining the test cases separate while integrating and performing a single CTITS for each of the separate test cases and improving a speed the automation test set is completed.

During operation, processor 102 may detect automation test set 200 stored in a memory of information handling system 100, such as memory 120. Based on detection of automation test set 200, processor 102 may determine whether multiple test cases include a CTITS. If so, processor 102 may create a CTITS module for each CTITS within the test cases of automation test set 200. For example, processor 102 may create CTITS modules 208 and 210 and each CTITS module may have a unique identifier. Test step code 250 and 252 within CTITS module 208 may be any suitable code for execution by processor 102 that is needed in both normal test cases 202 and 204. Test step code 260 and 262 within CTITS module 210 may be any suitable code for execution by processor 102 that is needed in both normal test cases 202 and 204. However, if any of the test cases have different time-intensive test case steps, these time-intensive test case steps are performed or executed separately and processor does not change how the associated test cases are performed.

In an example, processor 102 may create normal test cases 202 and 204, and the normal test cases may have different identifiers. During the creation of normal test case 202, processor 102 may break or separate the test step code into different portions or sections based on locations of the CTITS within the test step code of the normal test case. For example, processor 102 may separate a pre-CTITS test step code 220 with a flag having the identifier for CTITS module 208 at the end of the test step code. In this example, the flag may cause a pause in the execution of normal test case 202 until test step codes 250 and 252 in CTITS module 208 are performed.

In certain examples, processor 102 may also separate test step code 222 for execution after the CTITS module 208 is completed, and this test step code may include flag having the identifier for CTITS module 210 at the end of the test step code. In this example, the flag may cause a pause in the execution of normal test case 202 until test step codes 260 and 262 in CTITS module 210 are performed. Test step code 222 may be referred to as post-CTITS test step code for CTITS module 208, and also as pre-CTITS test step code for CTITS module 210. Processor 102 may also separate test step code 224 for execution after the CTITS module 210 is completed. Test step code 224 may be referred to as post-CTITS test step code for CTITS module 210.

During the creation of normal test case 204, processor 102 may break or separate the test step code into different portions or sections based on locations of the CTITS within the test step code of the normal test case. For example, processor 102 may separate a pre-CTITS test step code 230 with a flag having the identifier for CTITS module 208 at the end of the test step code. In this example, the flag may cause a pause in the execution of normal test case 204 until test step codes 250 and 252 in CTITS module 208 are performed.

In certain examples, processor 102 may also separate test step code 232 for execution after the CTITS module 208 is completed, and this test step code may include flag having the identifier for CTITS module 210 at the end of the test step code. In this example, the flag may cause a pause in the execution of normal test case 202 until test step codes 260 and 262 in CTITS module 210 are performed. Test step code 232 may be referred to as post-CTITS test step code for CTITS module 208, and also as pre-CTITS test code for CTITS module 210. Processor 102 may also separate test step code 234 for execution after the CTITS module 210 is completed. Test step code 234 may be referred to as post-CTITS test step code for CTITS module 210.

In an example, processor 102 may create or develop virtual test case 206, which may be utilized to implement CTITS modules 208 and 210. For example, processor 102 may generate events 240, 242, and 244 within virtual test case 206. Event 240 may be a pre-CTITS 208 event, event 242 may be both a post-CTITS 208 and a pre-CTITS 210 event, and event 244 may be a post-CTITS 210 event. In certain examples, virtual test case 206 may include code to cause CTITS modules 208 and 210 to be executed as will be described below. Processor 102 may register normal test cases 202 and 204 with virtual test case 206 so that these normal test cases may receive notification of when to execute different test step code.

During execution of automation test set 200, processor 102 may perform steps 270, 272, 274, 276, 278, 280, 282, 284, and 286. At step 270, processor 102 may begin execution of virtual test case 206. At step 272, processor 102 may publish pre-CTITS event 240. In an example, the pre-CTITS event 240 may be published or provided to both normal test cases 202 and 204 based on these normal test cases being registered with virtual test case 206. In response to receiving event 240, test step code 220 within normal test case 202 may be executed until the flag for CTITS module 208 is reached. After reaching the flag, normal test case 202 may return a notification to virtual test case 206 that pre-CTITS 208 code has been completed. Similarly, in response to receiving event 240, test step code 230 within normal test case 204 may be executed until the flag for CTITS module 208 is reached. After reaching the flag, normal test case 204 may return a notification to virtual test case 206 that pre-CTITS 208 code has been completed.

In response to receiving the notification that the pre-CTITS 208 code has been completed in both normal test cases 202 and 204, virtual test case 206 may execute CTITIS 208 at step 274. For example, processor may execute test step code 250 and 252 within CTITS module 208. Based on the completion of CTITS module 208, processor 102 may publish event 242 at step 276. In an example, the event 242 may be published or provided to both normal test cases 202 and 204 based on these normal test cases being registered with virtual test case 206.

In response to receiving event 242, test step code 222 within normal test case 202 may be executed until the flag for CTITS module 210 is reached. After reaching the flag, normal test case 202 may return a notification to virtual test case 206 that post-CTITS 208 code and pre-CTITS 210 code have been completed. Similarly, in response to receiving event 242, test step code 232 within normal test case 204 may be executed until the flag for CTITS module 208 is reached. After reaching the flag, normal test case 204 may return a notification to virtual test case 206 that post-CTITS 208 code and pre-CTITS 210 code have been completed.

In response to receiving the notification that the post-CTITS 208 code and pre-CTITS 210 code have been completed in both normal test cases 202 and 204, virtual test case 206 may execute CTITIS 210 code at step 278. For example, processor may execute test step code 260 and 262 within CTITS module 208. Based on the completion of CTITS module 210, processor 102 may publish event 244 at step 280. In an example, the event 244 may be published or provided to both normal test cases 202 and 204 based on these normal test cases being registered with virtual test case 206. At step 282, processor 102 may then generate a test report for automation test set 200.

In response to receiving event 244, test step code 224 within normal test case 202 may be executed and processor 102 may generate a test report 284 for automation test set 200. In an example, test report 284 may include any suitable data associated with test step code 220, 222, and 224 of automation test set 200. Similarly, in response to receiving event 244, test step code 234 within normal test case 204 may be executed and processor 102 may generate a test report 286 for automation test set 200. In an example, test report 286 may include any suitable data associated with test step code 230, 232, and 234 of automation test set 200.

Figure 3:
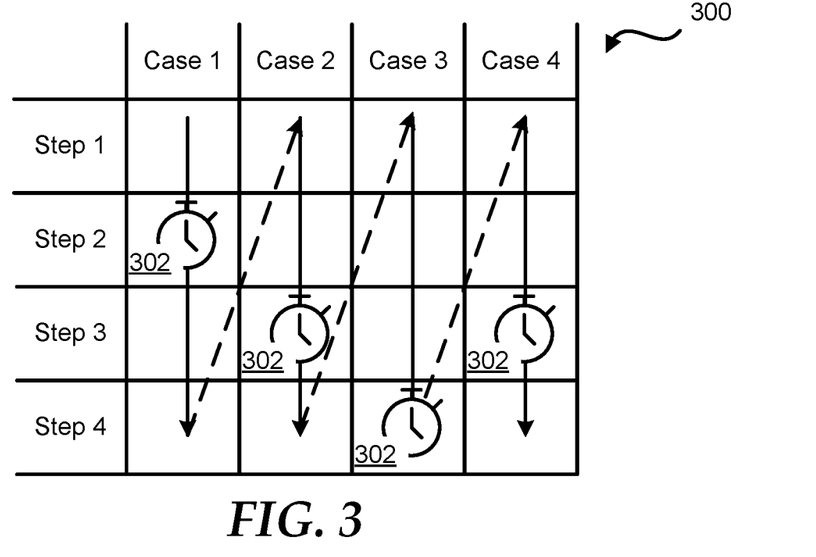
FIG. 3 is a diagram of an initial automation test set of an information handling system according to at least one embodiment of the present disclosure.

FIG. 3 illustrates an initial automation test set 300 of an information handling system according to at least one embodiment of the present disclosure. Initial automation test set 300 includes test cases 1, 2, 3, and 4, and each test case includes test steps 1, 2, 3, and 4. While FIG. 3 illustrates test cases 1, 2, 3, and 4, and test steps 1, 2, 3, and 4, automation test set 300 may include any suitable number of test cases and test steps without varying from the scope of this disclosure. As illustrated in FIG. 3, each of the test cases 1, 2, 3, and 4 may include the same CTITS 302, but the CTITS may be located at different test steps of the test cases. For example, test case 1 may include CTITS 302 at test step 2, test case 2 may include CTITS 302 at test step 3, test case 3 may include CTITS 302 at test step 4, and test case 4 may include CTITS 302 at test step 4. In an example, test cases 1, 2, 3, and 4 may be executed in order as illustrated by the dashed arrows in FIG. 3.

In an example, test step 1 of test case 1 may be a pre-CTITS test step, and test steps 3 and 4 may be post-CTITS test steps. Test steps 1 and 2 of test case 2 may be pre-CTITS test steps, and test steps 3 and 4 may be post-CTITS test steps. Similarly, test steps 1, 2, and 3 of test case 3 may be pre-CTITS test steps, and this test case may not include any post-CTITS test steps. Test steps 1 and 2 of test case 4 may be pre-CTITS test steps, and test step 4 may be a post-CTITS test step. If CTITS 302 is separately executed in each of test cases 1, 2, 3, and 4, automation test set 300 may require a lot of time to be executed. Thus, automation test set 300 may be improved and shorten by CTITS 302 being executed once within the automation test set.

Figure 4:
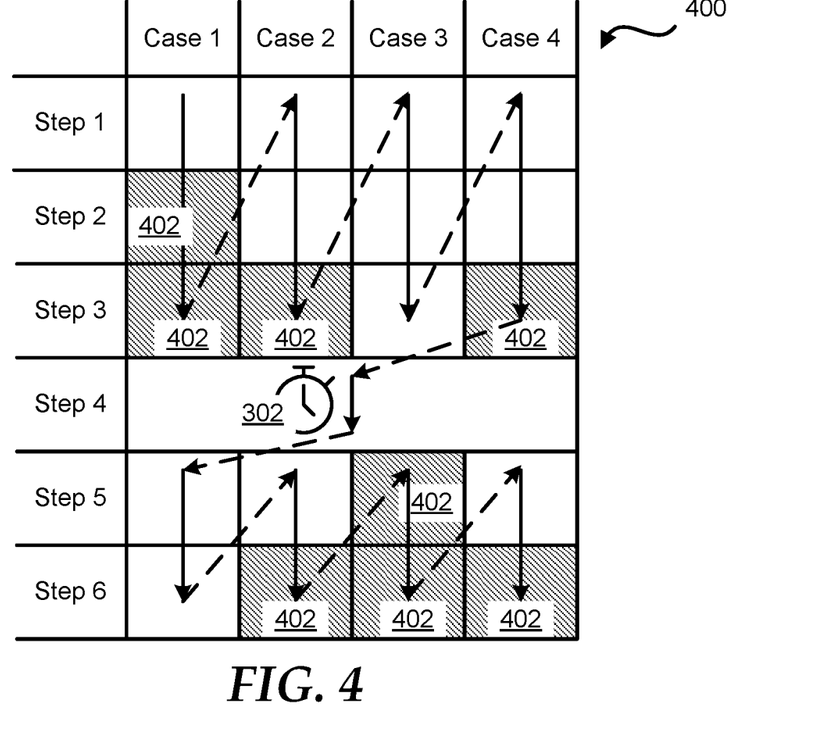
FIG. 4 is a diagram of multiple test cases created from the initial automation test set according to at least one embodiment of the present disclosure.

FIG. 4 illustrates a partially merged automation test set 400 according to at least one embodiment of the present disclosure. During a partial merging operation, a processor, such as processor 102 of FIG. 1, may determine latest in order test step wherein CTITS 302 is executed within test cases 1, 2, 3, and 4. For example, the latest test step for CTITS 302 is test step 4 of test case 3. In this example, processor 102 may increase the number of test steps for each test case to create automation test set with CTITS 302 only being executed one time. In an example, test cases 1, 2, 3, and 4 may be executed in order as illustrated by the dashed arrows in FIG. 4.

In certain examples, processor 102 may insert blank steps 402 into the pre-CTITS of the test cases 1, 2, 3, and 4. For example, processor 102 may insert blank test step 402 into test steps 2 and 3 of test case 1. Processor 102 may insert blank test step 402 into test step 3 of test case 2. Based on test case 3 already having CTITS 302 in test step 4, processor 102 may not insert any blank steps 402 within a pre-CTITS portion of test case 3. Processor 102 may insert blank test step 402 into test step 3 of test case 4. Based on the addition of blank step 402, each of test cases 1, 2, 3, and 4 may have the same number of pre-CTITS test steps.

In an example, processor 102 may insert blank steps 402 into the post-CTITS of the test cases 1, 2, 3, and 4. Based on test case 1 already having two post-CTITS test steps, processor 102 may not insert any blank steps 402 within the post-CTITS portion of test case 1. Processor 102 may insert blank test step 402 into test step 6 of test case 2. Processor 102 may insert blank test step 402 into test steps 5 and 6 of test case 3. Processor 102 may insert blank test step 402 into test step 6 of test case 4. Based on the addition of blank step 402, each of test cases 1, 2, 3, and 4 may have the same number of post-CTITS test steps.

Figure 5:
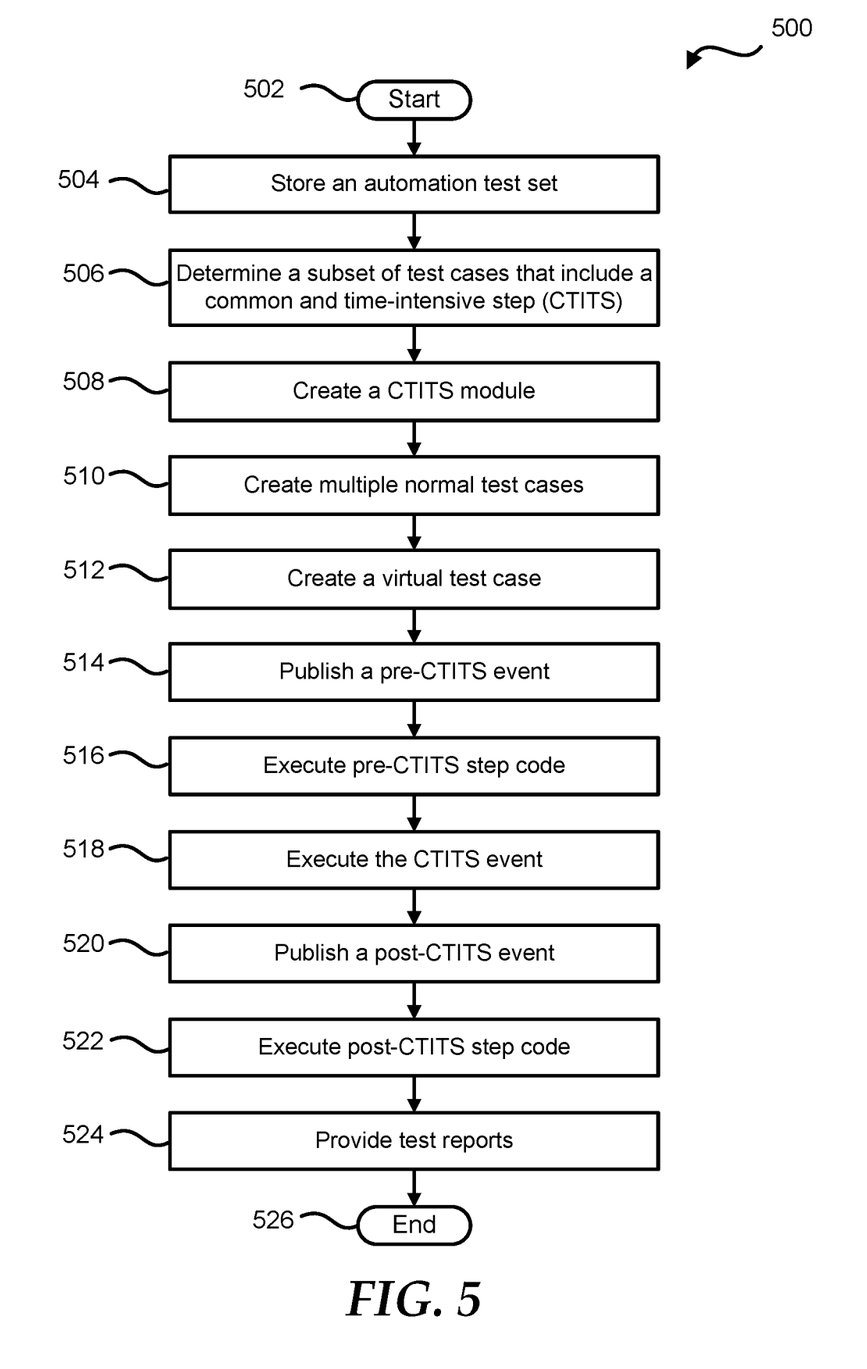
FIG. 5 is a flow diagram of a method for performing an automation test within an information handling system according to at least one embodiment of the present disclosure.

FIG. 5 is a flow diagram of a method 500 for performing an automation test within an information handling system according to at least one embodiment of the present disclosure, starting at block 502. In an example, the method 500 may be performed by any suitable component including, but not limited to, a processor, such as processor 102 or 104 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 504, an automation test set for an information handling system is stored on a memory of the information handling system. In an example, the automation test set includes multiple test cases. In certain example, the automation test is a firmware test for the information handling system. At block 506, each test case of a subset of the test cases is determined to include a same common and time-intensive test step (CTITS). In an example, a processor of the information may perform the determination of the subset of the test cases. At block 508, a CTITS module is created based on the same CTITS in the subset test cases.

At block 510, multiple normal test cases are created. In an example, the multiple normal test cases, such as first and second normal test cases, may be created based on the subset of test cases of the automation test set. In certain examples, an identification for the CTITS is inserted within each of the normal test cases. At block 512, a virtual test case is created to implement the CTITS. At block 514, a pre-CTITS event is published to the first and second normal test cases. In an example, the pre-CTITS event may be published via the virtual test case, and may be any suitable event to cause the first and second normal test cases to perform one or more steps or operations in respective test step code.

At block 516, pre-CTITS step code is performed. In certain examples, the pre-CTITS step code may be one or more steps within the normal test case to be performed prior to the CTITS. In an example, the first and second normal test cases may include a different number of steps within the pre-CTITS step code. In certain examples, one or more blank steps may be inserted into the pre-CTITS step code of the first or second normal test case to create an equal number of steps in each respective pre-CTITS test step code. In response to execution of pre-CTITS step code being completed in both the first and second normal test cases, the CTITS is executed. In an example, the CTITS may be executed via the CTITS module, and the CTITS may include one or more sets of test step code.

At block 520, a post-CTITS event is published. In an example, the post-CTITS event may be published via the virtual test case, and may be any suitable event to cause the first and second normal test cases to perform one or more steps or operations in respective test step code. At block 522, post-CTITS step code is performed. In certain examples, the post-CTITS step code may be one or more steps within the normal test case to be performed after the CTITS. In an example, the first and second normal test cases may include a different number of steps within the post-CTITS step code. In certain examples, one or more blank steps may be inserted into the post-CTITS step code of the first or second normal test case to create an equal number of steps in each respective post-CTITS test step code. In response to execution of post-CTITS step code being completed in both the first and second normal test cases, one or more test results may be reported at block 524 and the flow ends at block 526.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
 a memory configured to store an automation test set for the information handling system, wherein the automation test set includes a plurality of test cases; and
 a processor configured to communicate with the memory, the processor to:
  determine that each test case of a subset of the test cases includes a same common and time-intensive test step (CTITS);
  create a CTITS module based on the same CTITS in the subset test cases;
  create multiple normal test cases based on the test cases of the automation test set, wherein an identification for the CTITS is inserted within each of the normal test cases, wherein normal test cases include first and second normal test cases;
  create a virtual test case to implement the CTITS;
  execute first test step code within the first normal test case;

execute second test step code within the second normal test case; and in response to execution of both the first and second test step code being completed, execute the CTITS via the CTITS module.

2. The information handling system of claim 1, wherein the processor further to:

publish, via the virtual test case, a pre-CTITS event to the first and second normal test cases, wherein the first test step code is executed in the first normal case in response to the pre-CTITS event and the second test step code is executed in the second normal case in response to the pre-CTITS event.

3. The information handling system of claim 1, wherein the first test step code includes more steps to be performed than the second test step code.

4. The information handling system of claim 3, wherein blank steps are inserted into the second test step code, wherein a number of blank steps is equal to a number of steps the first test step code that is greater than the second test step code.

5. The information handling system of claim 1, wherein in response to the CTITS being executed, the processor further to:

publish, via the virtual test case, a post-CTITS event to the first and second normal test cases, wherein a third test step code is executed in the first normal case in response to the post-CTITS event and a fourth test step code is executed in the second normal case in response to the post-CTITS event.

6. The information handling system of claim 5, wherein the first and second normal test cases receive the post-CTITS event based on the first and second normal test cases being subscribing test cases to the virtual test case.

7. The information handling system of claim 5, wherein in response to the third test step code being executed, the processor further to:

publish a first test report for the first normal test case.

8. The information handling system of claim 1, wherein the automation test is a firmware test for the information handling system.

9. A method comprising:

storing an automation test set for an information handling system, wherein the automation test set includes a plurality of test cases;

determining, by a processor of the information handling system, that each test case of a subset of the test cases includes a same common and time-intensive test step (CTITS);

creating a CTITS module based on the same CTITS in the subset test cases;

creating multiple normal test cases based on the test cases of the automation test set, wherein an identification for the CTITS is inserted within each of the normal test cases, wherein the normal test cases include first and second normal test cases;

creating a virtual test case to implement the CTITS;

executing first test step code within the first normal test case;

executing second test step code within the second normal test case; and in response to execution of both the first and second test step code being completed, executing the CTITS via the CTITS module.

10. The method of claim 9, further comprising:

publishing, via the virtual test case, a pre-CTITS event to the first and second normal test cases, wherein the first test step code is executed in the first normal case in response to the pre-CTITS event and the second test step code is executed in the second normal case in response to the pre-CTITS event.

11. The method of claim 9, wherein the first test step code includes more steps to be performed than the second test step code.

12. The method of claim 11, wherein blank steps are inserted into the second test step code, wherein a number of blank steps is equal to a number of steps the first test step code that is greater than the second test step code.

13. The method of claim 9, wherein in response to the CTITS being executed, the method further comprises:

publishing, via the virtual test case, a post-CTITS event to the first and second normal test cases, wherein a third test step code is executed in the first normal case in response to the post-CTITS event and a fourth test step code is executed in the second normal case in response to the post-CTITS event.

14. The method of claim 13, wherein the first and second normal test cases receive the post-CTITS event based on the first and second normal test cases being subscribing test cases to the virtual test case.

15. The method of claim 13, wherein in response to the third test step code being executed, the method further comprises:

publishing a first test report for the first normal test case.

16. The method of claim 9, wherein the automation test is a firmware test for the information handling system.

17. An information handling system comprising:

a memory configured to store an automation test set for the information handling system, wherein the automation test set includes a plurality of test cases; and a processor configured to:

determine that each test case of a subset of the test cases includes a same common and time-intensive test step (CTITS);

create a CTITS module based on the same CTITS in the subset test cases;

create multiple normal test cases based on the test cases of the automation test set, wherein an identification for the CTITS is inserted within each of the normal test cases, wherein the normal test cases include first and second normal test cases;

create a virtual test case to implement the CTITS;

publish, via the virtual test case, a pre-CTITS event to the first and second normal test cases;

in response to the pre-CTITS event:

execute a first test step code within the first normal test case; and execute a second test step code within the second normal test case;

in response to execution of both the first and second test step code being completed, execute the CTITS via the CTITS module;

publish, via the virtual test case, a post-CTITS event to the first and second normal test cases;

execute a third test step code in the first normal case in response to the post-CTITS event; and execute a fourth test step code in the second normal case in response to the post-CTITS event.

18. The information handling system of claim 17, wherein the first test step code includes more steps to be performed than the second test step code.

19. The information handling system of claim 18, wherein blank steps are inserted into the second test step code, wherein a number of blank steps is equal to a number of steps the first test step code that is greater than the second test step code.

20. The information handling system of claim 17, wherein the automation test is a firmware test for the information handling system.

\* \* \* \* \*